United States Patent Office 3,448,608
Patented June 10, 1969

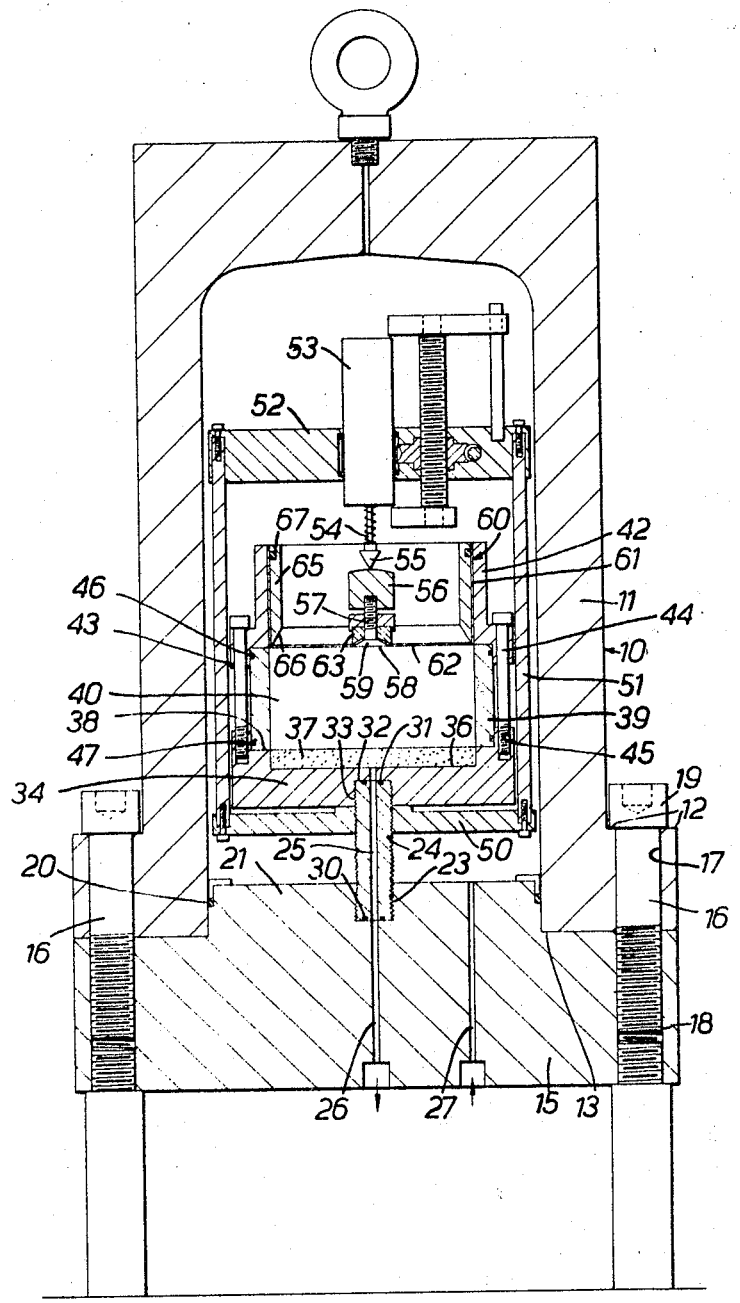

1

3,448,608
OEDOMETERS
Alan Wilfred Bishop and Angus Evan Skinner, London, England, assignors to Wykeham Farrance Engineering Limited
Filed Mar. 8, 1968, Ser. No. 711,714
Claims priority, application Great Britain, Mar. 9, 1967, 11,169/67
Int. Cl. G01n 3/08
U.S. Cl. 73—94                   7 Claims

ABSTRACT OF THE DISCLOSURE

This invention relates to oedometers for the testing of geological or manufactured samples. The aim is to maintain a uniform application of pressure over the face of the sample to which pressure is applied and movement of which face is measured to determine the desired characteristics of the sample. The invention provides an oedometer one wall of a testing cell of which is capable of sealing relationship with the remainder of the cell but otherwise being entirely unattached thereto so as to permit the wall to cause consolidation of the sample when a pressure differential is applied across the wall, such consolidation being accompanied by bodily translational movement of the whole wall with respect to the remainder of the cell.

---

This invention relates to oedometers for the testing of geological samples. Whilst the term "geological" is used herein and is consistent for many applications, for example, for testing bore hole samples, it is to be understood that the oedometer can also be used for testing manufactured samples.

One of the problems which has been experienced with the testing of geological samples, particularly of materials which undergo considerable consolidation during testing, is to maintain a uniform application of pressure over the face of the sample to which pressure is applied and movement of which face is measured to determine the desired characteristics of the sample. Whereas with certain samples a consolidation movement of the wall of the sample to which pressure is applied may only be of the order of a ¼" or ½", with certain other samples particularly clays, the consolidation can be of such an order that the wall upon which the pressure is applied can move a distance of several inches. As has been said it has been difficult to maintain accurate application of pressure over the whole of the wall during its movement and it is therefore the object of the present invention to provide an oedometer in which these drawbacks are alleviated or overcome.

According to the present invention an oedometer comprises a testing cell adapted closely to receive a sample for test therein, one wall of the cell being capable of sealing relationship with the remainder of the cell but otherwise being entirely unattached thereto so as to permit the wall to cause consolidation of the sample when a pressure differential is applied across the wall, such consolidation being accompanied by bodily translational movement of the whole wall with respect to the remainder of the cell.

Conveniently the wall may comprise a piston mounted for reciprocal movement in a cylindrical part of the remainder of the cell. The said one wall of the cell may be integral with and form a transverse end wall of an elongated hollow cylinder. In order to obtain the desired stress conditions the transverse end wall is preferably formed of flexible material. This may, for example, be achieved by employing a rubber cup which forms both the elongated hollow cylinder and the transverse end wall. In this case the hollow cylinder may have a locating ring received within it to hold the cylinder adjacent the cylindrical part of the remainder of the cell. In such a case a sealing ring is preferably included between the locating ring and the flexible hollow cylinder to provide a light outward bias on the hollow cylinder to cause this initially to seal against the cylindrical part of the remainder of the cell so as to avoid seepage of consolidation fluid until adequate pressure has built up to maintain the whole cylinder in engagement with the remainder of the cell.

Alternative constructions may comprise a piston having a relatively rigid cylindrical part and a flexible transverse end wall. This may be formed as an integral moulding for example of poly tetra fluoro ethylene (P.T.F.E.). Alternatively the cylindrical wall may be formed of relatively thick metal to which is welded or brazed a diaphragm in the form of a flexible disc forming the transverse end wall to which pressure is applied.

The invention may be carried into practice in a number of ways but one specific embodiment will now be described by way of example with reference to the accompanying drawing which illustrates a sectional elevation of an oedometer according to the invention.

The drawing illustrates an outer pressure vessel generally shown at 10 and which comprises a bell 11, the lower end of the skirt of which has an outer shoulder 12. The lower end of the skirt rests upon a ledge 13 which extends around the periphery of the upper side of a base 15. A number of clamping bolts 16 extend through bores 17 in the base of the bell and into screw threaded bores 18 in the base 15, each bolt having an enlarged head 19 which bears upon the shoulder 12 so that the bell, as a whole, can be securely clamped to the base 15. A suitable O-ring seal 20 is provided on the inner periphery of the bell between it and a central annular portion 21 of the base 15.

The centre of the annular portion 21 of the base 15 is provided with a threaded recess 23 to receive a threaded cell-supporting sleeve 24 having a central bore 25 therein which, when assembled, is in alignment with a further drainage bore 26 formed in the base 15 to permit the drainage of fluid from the sample to be tested in a manner to be described. Also for a purpose to be described is a further bore 27 extending vertically through the base 15 for supplying a pressurizing fluid to within the bell. The lower end of the cell supporting sleeve 24 has in its end face an O-ring 30 which seals against the lower end of the threaded recess 23.

The upper end of the seal supporting sleeve 24 is provided with a similar O-ring seal 31 which abuts an end wall 32 of a recess 33 formed in the under side of a lower platten 34 of a testing cell into which recess 33 the upper end of the cell-supporting sleeve 24 is firmly screwed.

The upper surface of the lower platten 34 of the cell is of stepped configuration so as to afford a central circular recess 36 which receives a porous filter disc 37. A further recess 38 of larger diameter than the recess 36 receives the lower end of a cylindrical sample-receiving ring 39 this ring being arranged closely to receive the sample 40 for testing purposes.

Surmounting the sample-receiving ring 39 is a guide cylinder 42 having at its lower end an enlarged skirt 43 which overlies the upper end of the ring 39 and through which extend a number of clamping bolts 44 which extend downwards at spaced peripheral points into threaded engagement with bores 45 in the lower platten 34 thereby to clamp the guide cylinder 42, the sample ring 39 and the platten 34 securely together as one unit. If desired these three parts could be formed in one piece. Further O-rings 46 and 47 are provided between the sample ring 39 and the skirt 43 and the platten 34 respectively. It is to be noted that the outer dimensions of the platten 34 and guide cylinder 42 are such as to leave a considerable space between those parts and the inner wall of the bell 11.

Extending beneath the platten 34 is a lower plate 50 of a yoke which further comprises a number of peripherally spaced vertical rods 51 the upper ends of which extend into an upper plate 52. The upper plate carries a transducer 53 having a vertically movable element 54 extending downwards therefrom. The transducer thus has an origin of measurement at the base of the platten 34, the element 54 extending into the space formed within the guide cylinder 42 and carrying a conical member 55 at its lower end. The point of this member 55 rests on a head piece 56 which surmounts a rod 57. The lower end 59 of the rod 57 is of enlarged frusto-conical form to provide an undersurface 58 which bears upon the sample 40.

A cup shaped flexible "piston" 60 formed of rubber or neoprene is provided which has a cylindrical wall 61 received within the guide cylinder 42 and an end-face or crown 62 extending across the upper face of the sample 40. The centre region of the crown 62 is clamped to the upper face of the frusto-conical lower end 59 of the rod 57 by means of a clamping member 63.

Mounted within the cylindrical wall 61 is a cylindrical locating member 65 formed e.g. of steel, aluminum or brass, this member having a chamfered lower end 66 and an O-ring seal 67 adjacent its upper outer end.

Operation of the oedometer described above is as follows. The sample 40 is first prepared. This may be either an artificially formed sample or a cut sample having an outer diameter substantially equal to the inner diameter of the sample ring 39 and trimmed to the axial length of the sample-receiving ring 39 so that after the porous filter 37 has been put into position the sample ring 39 together with the sample located therein can be assembled within the yoke formed by the plates 50 and 52 and their interconnecting rods 51, the complete unit thereafter being placed upon the base 15. The bell 11 is then put in position and clamped down by means of the bolts 16.

Pressurizing fluid can thereafter be admitted via the bore 27 into the space within the bell 11 and the desired pressure created within the bell will act on all the parts of the cell located within the bell. The O-ring seal 67 is so designed as to cause the cylindrical wall 61 initially lightly to bear against the inner face of the guide cylinder 42 so that the pressurizing fluid does not seep between the cylindrical wall 61 and the guide cylinder 42. As soon as a pressure is built up within the bell this will, of course, maintain the cylindrical wall closely in engagement with the guide cylinder 42.

The pressure of the pressurizing fluid will act over the whole face of the crown 62 and also will act downwards on the face 58 of the underside of the frusto-conical lower end of the rod 57 so as evenly to distribute the pressure over the whole of the top of the sample. The fact that the crown 62 is of a flexible nature achieves uniformity of consolidating pressure on the sample under test. There is negligible friction between the cylindrical wall 61 and the guide cylinder 42 so that as consolidation takes place the crown 62 is under no restraint at its periphery and, therefore, can freely move downward to the extent required due to the consolidation which may, for example, be several inches with certain materials to be tested. Whilst frictional stress will be generated along the inner wall of the sample ring 39, because measurement of the consolidation is only made over a limited area in the middle of the sample, the effects of the frictional stress are eliminated.

During consolidation pore fluid will pass into the porous filter 37 and freely drain therefrom via the bores 25 and 26. The conical member 55 of the lower end of the vertically movable element 54 will accurately follow the downward movement of the crown 62 this movement being sensed by the transducer 53 and conveyed by suitable mechanisms to a measuring device located outside the bell.

It is to be noted that the entire cell is surrounded with pressurizing fluid to provide substantially complete pressure compensation with the exception of the surface within the O-ring 30. This substantial pressure compensation overcomes inaccuracies which can occur due to stresses which might otherwise be created within the mechanism during consolidation. The transducer is located entirely within the bell and by using suitable magnetic transducing methods this avoids the necessity of a seal between moving parts which might otherwise be required in order to transfer the movement due to consolidation via mechanical measuring means through the wall of the bell.

At the same time the fact that the whole of the movable wall is completely independent of the guide cylinder 42 enables ready assembly of the sample within the sample ring 39, there being no necessity to separate any clamping which might otherwise exist between the movable wall and the guide cylinder 42.

Whilst a freely moving "piston" formed of rubber or neoprene, and supported by the metal cylinder 65 has been described, it is to be understood that this could be formed in other ways. For example, the "piston" could be formed as a plastic moulding which might for example be provided with an axial extension extending upwards from the centre of the crown 62 to surround the rod 57 and obtain an even better seal. In this instance a similar supporting cylinder 65 would again be employed unless the wall thickness of the side of the moulding were made thick enough to be self-supporting. This could for example be arranged with a moulding of P.T.F.E. Again, as another alternative the cylindrical part of the free "piston" might be made merely of steel in which case the seal 67 would have to withstand the consolidating pressure throughout the test. With such a construction, the crown of the piston would be formed as a thin-gauge steel disc welded or brazed at its periphery to the lower end of the cylindrical wall. As with the arrangement shown in the drawing in either alternative, i.e., either the P.T.F.E. moulding or the steel construction, it would be arranged that the upper surface of the crown would extend substantially to the edge of the piston, having as small a radial connection as possible with the cylinder of the piston so as to ensure the maximum possible flexibility of the crown adjacent its periphery.

What we claim as our invention and desire to secure by Letters Patent is:

1. An oedometer comprising a testing cell adapted closely to receive a sample for test therein, one wall of the cell being formed of a flexible material and capable of sealing relationship with the remainder of the cell but otherwise being entirely unattached thereto so as to permit the wall to impose substantially uniform stress to an area of the surface of the sample and cause consolidation of the sample when a pressure differential is applied across the wall, such consolidation being accompanied by bodily translational movement of the whole wall with respect to the remainder of the cell.

2. An oedometer as claimed in claim 1 in which the said one wall comprises a piston mounted for reciprocal movement in a cylindrical part of the remainder of the cell.

3. An oedometer as claimed in claim 2 in which the piston comprises an integral moulding including a rigid cylindrical part and a flexible transverse end wall.

4. An oedometer as claimed in claim 1 in which the said one wall of the cell is integral with and forms a transverse end wall of an elongated hollow cylinder.

5. An oedometer as claimed in claim 4 in which the transverse end wall is formed of rubber.

6. An oedometer as claimed in claim 4 in which the hollow cylinder has a locating ring received within it to hold the cylinder adjacent the cylindrical part of the remainder of the cell.

7. An oedometer as claimed in claim 6 in which a sealing ring is included between the locating ring and the flexible hollow cylinder.

References Cited

UNITED STATES PATENTS

| | | | |
|---|---|---|---|
| 2,471,227 | 5/1949 | Marshall | 73—94 |
| 2,907,203 | 10/1959 | Langmead | 73—94 |
| 3,054,286 | 9/1962 | Karol | 73—94 |
| 3,178,935 | 4/1965 | McRitchie | 73—94 |
| 3,216,242 | 11/1965 | Eyrich | 73—94 |

FOREIGN PATENTS 939,294   2/1956   Germany.

RICHARD C. QUEISSER, *Primary Examiner.*

JERRY W. MYRACLE, *Assistant Examiner.*

U.S. Cl. X.R.

73—84